METHOD OF INDEPENDENTLY OPERATING A GROUP OF STAGES WITHIN A DIFFUSION CASCADE

This invention relates to an improvement in the operation of a countercurrent gaseous diffusion cascade.

In recent years the diffusion method of separating gases or vapors which were difficultly separable by other methods has reached a relatively high stage of development. The method is extremely advantageous in separating gases or vapors which differ from each other only in molecular or atomic weight. Typical examples of such gases or vapors are, of course, the isotopic species of such elements as chlorine, mercury or of such compounds as uranium hexafluoride.

In carrying out the diffusion method a mixture of gases to be separated is flowed under carefully controlled conditions of pressure, temperature, etc. across one surface of a finely porous diffusion membrane. Gas of relatively low molecular weight tends to diffuse through the membrane more rapidly than the gas of higher molecular weight. As a result the gas passing through the membrane is enriched with respect to the lighter component. The gas passing through the membrane must, of course, be removed from the surface of the membrane in order that the diffusion process continue. Again on the diffused gas side of the membrane the conditions established in the gas must be carefully controlled, that is, temperature, pressure and the like. The control of the conditions in the gas streams both of the original gaseous mixture, of the gas diffusing through the membrane and of the undiffused gas must be carried out with a high degree of precision.

Where the gases to be separated differ from each other by a very small percentage of their molecular or atomic weights or when one of the gases to be separated is present only in a very small concentration, a large cascade of diffusion membranes is generally required, the stages in such a cascade being numbered possibly in the thousands.

The usual diffusion cascade is operated with countercurrent flow. That is, the product of each stage enriched in light component provides a portion of the feed for the next succeeding stage in the cascade; the product of each stage depleted with respect to the light component is recirculated to provide the remainder of the feed for the next preceding stage. Thus, the feed for each stage comprises the lower molecular weight product of the next preceding stage together with the higher molecular weight product of the next succeeding stage. The general theory of the operation of such cascades is described in articles by M. Benedict, Transactions of the American Institute of Chemical Engineers, 43, 41 (1947) and by K. Cohen in "The Science and Engineering of Nuclear Power", Volume 2, edited by C. Goodman, Addison-Wesley, 1949.

In the operation of a large diffusion cascade of the type described, it often becomes desirable to operate a small group of stages independently of the remainder of the cascade. Such an occasion might arise in the event of a failure of some portion of the equipment involved in the operation of the group. In this event it is desirable that the group of stages be by-passed while repairs are made. Another such occasion arises where a group of stages is to be tested prior to its connection into the main part of the cascade. This may occur where a stand-by group is to be used in the place of a group of stages already in the cascade or under other circumstances. The normal method of operating such a portion of a cascade would be to employ what is often termed total reflux conditions. That is to say, the product of the top stage of the group is recirculated to provide feed for the top stage while the bottoms produced in the bottom stage of the group are recirculated to provide feed for the bottom stage of the group. The inventory of the group of stages thus remains unchanged and the group of stages may be said to be idling. However, when such a group of stages is operated in this manner for any length of time a considerable problem arises in attempting to connect the group of stages in its normal position in the cascade.

The problem arises in this way. There is usually in the cascade a certain amount of diluent gas which is of a substantially different molecular weight from the gases being separated. When the entire cascade is operating normally, this diluent gas is distributed throughout the cascade by controlling the conditions in the cascade. Provision may be made for removal of the diluent gas at intervals in the cascade by means of auxiliary apparatus designed and operated specifically to remove the diluent gas. However, where there is no such provision as, for example, in a relatively small group of stages, and the stages are operated under the conditions of total reflux described above, this diluent gas becomes concentrated either in the top stage or bottom stage of the group depending upon whether it is materially lighter or heavier than the gases being separated. At the same time the gases to be separated which will generally have nearly equal molecular weights will collect at the other end of the group of stages. When the group of stages is then joined to the remainder of the cascade the gas collected in the top and in the bottom stages of the idling group is immediately pumped into the remainder of the cascade. Since the diluent gas is substantially different in molecular weight from the gas in the remainder of the cascade there will be a sudden surge of this gas upward or downward through the cascade depending upon its relative molecular weight. Such a surge tends to upset the rather delicate equilibrium under which the cascade operates. Moreover, on being pumped into the cascade the diluent gas, generally having substantially different physical properties from the gas mixture in the cascade proper, would cause sudden changes in the load on the pumps and in the actions of the flow and pressure controllers as it passes through the cascade.

Accordingly, a general object is to provide a method of operating a cascaded group of gaseous diffusion stages without permitting a diluent gas of different molecular weight to be concentrated in the top or bottom stages.

Another object of this invention is to provide a method of operating an idling group of diffusion stages without causing a major change in the inventory distribution of the idling group.

A specific object of the invention is to prevent surges of gas in a cascade of diffusion stages when a small group of such stages is connected into the cascade.

Other objects will become apparent in the description following.

Generally speaking, the method of the present invention comprises operating a group of diffusion stages of the type described under its normal operating conditions while at the same time circulating the diffused gas produced in the top stage of the group to the feed of the U.S. Patent June 8, 1976 3,961,918
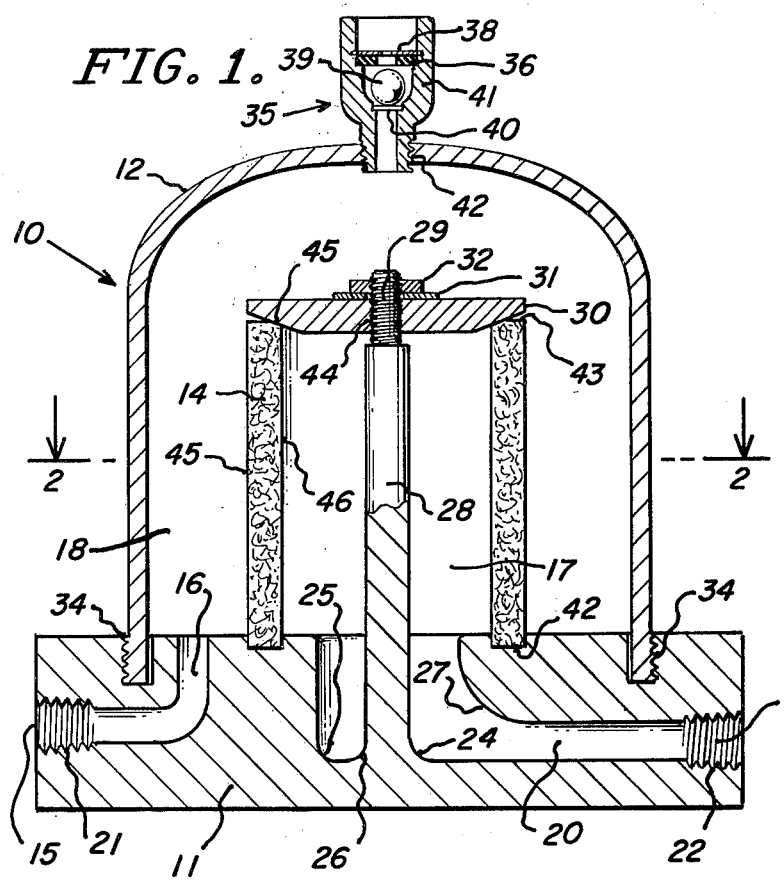
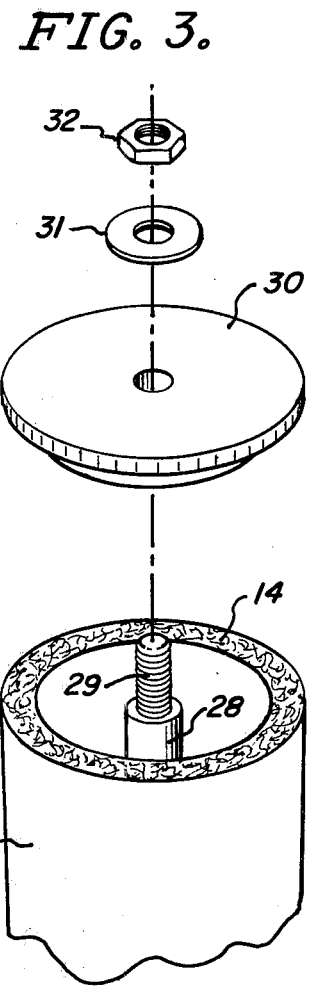
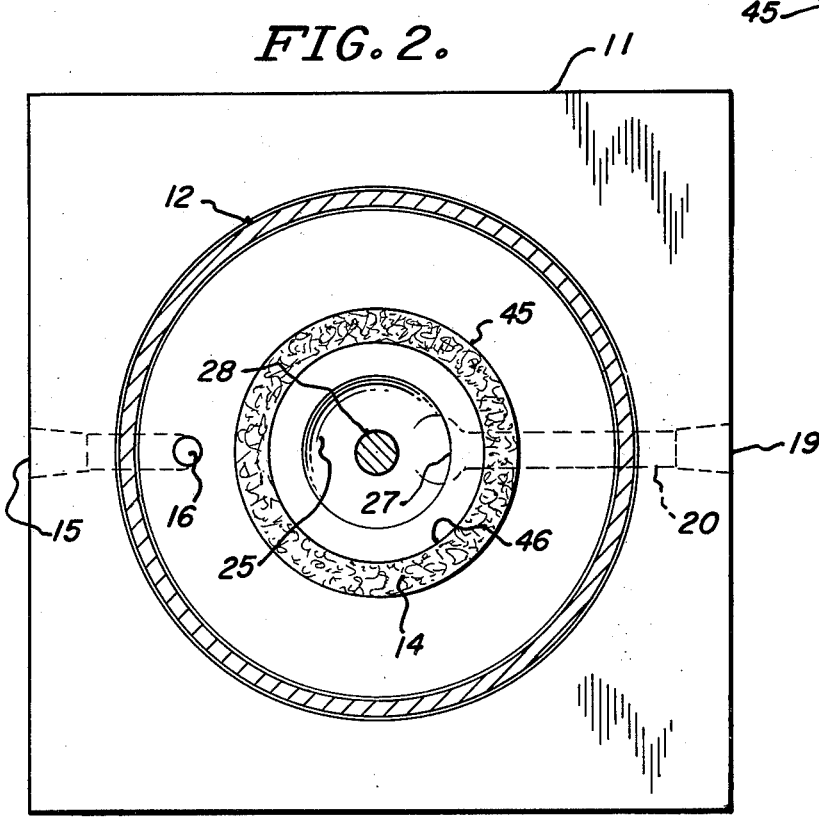

METHOD AND APPARATUS FOR DEGASSING LIQUIDS

This is a continuation of application Ser. No. 236,033, filed Mar. 20, 1972, now abandoned.

BACKGROUND OF THE INVENTION

The present invention relates generally to an improved method and apparatus for removing entrained and dissolved gases from liquids and more specifically to an improved method and apparatus for deaerating solutions used in connection with artificial kidney dialysis machines and in connection with water purification systems such as reverse osmosis systems.

Although there are a variety of needs for solutions in which the dissolved gases have been removed, one of the primary uses for such a solution is in connection with artificial kidney dialysis machines. A frequent problem encountered by many hospitals in the northern United States and Canada arose because of the presence of dissolved gases in the cold water in these areas which was used in the preparation of the dialysate for use in artificial kidney units.

The dialysate is the physiological salt solution which passes through the dialyzer portion of the kidney unit and "rinses" wastes from the blood. The preparation of the dialysate includes heating the water to body temperature after which the warm solution flows through the dialyzer where the turbulence releases the dissolved gases. Because the dialysate still contained many dissolved gases, it was necessary to install a bubble catcher in the blood line between the dialyzer and the patient in order to trap air bubbles. However, such a bubble catcher had to be evacuated every five to ten minutes throughout the ten to fourteen hour dialysis treatment to prevent air emboli from entering the patient. This was an extremely difficult and demanding task which if not accomplished could be fatal to the patient. Consequently, there is an extreme need for an apparatus which would be able to efficiently and economically remove dissolved and entrained gases from solutions. In the past, other attempts at removing dissolved gases from solutions have included heating the solution and exposing the solution to ultrasonic energy. None of these attempts, however, have been successfully applied in the preparation of air free dialysate for use in kidney machines.

A second application for the present invention is in connection with water purification systems such as reverse osmosis systems which normally remove over 90% of the dissolved salts in a solution but which passes most of the dissolved gases. Also, many technical and industrial processes require a gas free solution since dissolved gases can interfere with mixing, upset flow and often impart unusual reactions.

SUMMARY OF THE INVENTION

In contrast to the prior art, the present invention does not utilize heat, ultrasonic energy, or other means currently used to remove dissolved gases from solutions. Rather, the present invention provides an improved apparatus and method for efficiently and economically removing dissolved and entrained gases from solutions. With the present invention, the solution containing dissolved gases is introduced into a degassing chamber and exposed to a surface of a degassing member composed of a finely entwined and porous material which allows the solution to pass through but which causes the dissolved air and gases to be released from the solution in the form of thousands of tiny bubbles which coalesce on the surface of the degassing member. When the collected gas bubbles become sufficiently large, they rise to the top of the degassing chamber and are discharged. When the present invention is used in the preparation of air free dialysate for use in connection with kidney dialysis units, patients can be dialyzed ten to fourteen hours at a time without fear of air bubbles entering the blood. Thus, in addition to increased efficiency and safety, numerous personnel hours are saved.

Accordingly, it is an object of the present invention to provide an improved method and apparatus for removing dissolved gases from solutions.

Another object of the present invention is to provide an improved method and apparatus for removing dissolved gases from solutions without the use of heat or ultrasonic energy.

Another object of the present invention is to provide an improved method and apparatus designed to be used in connection with the preparation of dialysate for use in artificial kidney machines for preventing the injection of air bubbles into the blood stream of the patient.

Another object of the present invention is to provide an improved method and apparatus for removing dissolved gases from solutions which utilizes a unique degassing member which allows the solution to pass through but which causes the dissolved and entrained gases to coalesce at the surface of the member where they are collected and discharged.

A further object of the present invention is to provide an improved method and apparatus for removing dissolved gases from solutions which permits artificial kidney patients to be dialyzed 10 to 14 hours at a time without fear of air bubbles entering the blood.

These and other objects of the present invention will become apparent with reference to the drawings, the description of the preferred embodiment, and the appended claims.

DESCRIPTION OF DRAWINGS

FIG. 1 is a cross sectional view of the improved degasser of the present invention.

FIG. 2 is a cross sectional view of the improved degasser of the present invention taken along the line 2—2 of FIG. 1.

FIG. 3 is an expanded perspective view of the degassing member of the present invention.

DESCRIPTION OF THE PREFERRED EMBODIMENT

Referring first to FIGS. 1 and 2, the improved depassing apparatus 10 of the present invention includes generally a base 11, a casing 12 defining a degassing chamber 18 and a degassing member or cartridge 14 adapted to remove entrained and dissolved gases such as air, oxygen, nitrogen, carbon dioxide, etc. from a liquid.

More specifically, the base 11 includes an inlet port 15 connected with a degassing chamber 18 by an inlet conduit 16, and an outlet port 19 connected with a second chamber 17 inside of the degassing member 14 by an outlet conduit 20. It should be noted that each of the ports 15 and 19 contain internal threads 21 and 22 respectively enabling connections to be made between the ports 15 and 19 and auxiliary equipment in order to supply liquid containing entrained and dissolved gases to the degassing chamber 18 and to remove the deaerated liquid from the second chamber 17. Although not specifically shown, it is contemplated that the liquid to be deaerated may be supplied to and the deaerated liquid may be removed from the device 10 in a variety of ways such as positioning a pump upstream of the inlet port 15, downstream of the outlet port 19, or positioning a pump both upstream of the port 15 and downstream of the port 19 so that the liquid to be deaerated is caused to flow into the degassing chamber 18, through the member 14, into the chamber 17, and out through the outlet port 19.

Integrally formed with the base 11 and extending upwardly therefrom is a generally cylindrical center post 28 having a threaded portion 29 at its upper end. As illustrated also in FIG. 3, the threaded portion 29 extends through a cap member 30 and a gasket 31 and is adapted to threadedly engage a nut 32 which may be tightened over the threaded portion 29 to secure the cap 30 against the upper edge of the member 14. Although the center post 28 is shown to be integrally formed with the base 11, the center post 28 may be such that it is detachable from the base 11 via a threaded connection. The base 11 and thus the center post 28 may be constructed from a variety of materials such as polyethylene, polyvinyl chloride, stainless steel or aluminum, however, the inventor has found that polyethylene is preferable in many instances where the incoming solution contains dissolved salts which would be likely to corrode materials such as aluminum. It should be noted that the surfaces 24, 25, 26 and 27 are all rounded surfaces to minimize the chance that dissolved gases might collect in these areas to form an air bubble which would be released into the stream of the deaerated liquid.

Connected to the top surface of the base 11 is a cylindrically shaped hood or casing 12 which extends upwardly from the base 11 and around the degassing member 14 to thereby define the degasing chamber 18 and enclose the member 14. The casing 12 includes a plurality of exterior threads 34 around its bottom edge which are designed to engage corresponding internal threads in the base 11 to thereby secure the casing 12 to the base 11. Like the base 11, the casing 12 may be made of a variety of materials such as glass, stainless steel or polyethylene which in most cases is determined by the type of liquid being deaerated. Threadedly secured to the top portion of the casing 12 is a float valve 35 which is designed to prevent the liquid introduced into the chamber 18 from escaping and also, as will be discussed below, to allow air and other gases which are removed from the liquid to be discharged. The float valve 35 includes a valve seat or gasket 36 which is supported by the member 38 and a float ball 39 positioned below the seat 36 and adapted to seat against the seat 36 when the level of the liquid in the chamber 18 is sufficiently high. When the liquid level in the chamber is not high enough to cause the ball 39 to seat against the seat 36, the ball 39 is supported and retained by a stainless steel screen or float rest 40. Each of the elements 36, 38, 39 and 40 are housed by the valve casing 41 which is threadedly secured to the casing 12 by the threads 42. The float ball 39 has a consistency and buoyance such that it will float on water. Thus, if the liquid in the chamber 18 reaches a level at which it would normally flow through the valve 35, the ball 39 is forced upwardly against the seat 36 to prevent the water from escaping from the chamber 18. Although the preferred embodiment illustrates the casing 12 as being secured to the base 11 by a threaded connection, it is contemplated that the casing 12 may be clamped and sealed to the base 12 by other mean.

Next, by referring generally to FIGS. 1 and 2 and more specifically to FIG. 3, the degassing member 14 is an annular shaped cartridge in which the bottom edge is adapted to seat in an annular groove 42 in the base 11. It should be noted that the size of the groove 42 in the base 11 must be machined to fit the particular type and size of member 14 to be used in the device 10 to prevent leakage of the solution from the chamber 18 into the chamber 17 between the groove 42 and the member 14. As described below, the bottom edge of the member 14 is urged into the groove 42 by the cartridge securing means which includes the cap 30, the gasket 31, the center post 28, and the nut 32.

The cartridge cap 30 is a relatively circular member being constructed preferably of stainless steel or polyethylene. The cap 30 includes a hole 44 through which the threaded end 29 passes and a beveled edge 45 designed to engage the uppermost surface 43 of the member 14. By placing the cartridge 14 in the groove 42 and positioning the cap 30 and the gasket 31 over the threaded end 29, the nut 32 can be tightened to force the beveled edge 45 of the cap 30 against the member 14 to prevent liquid from passing between the cartridge 14 and the beveled edge 45.

When the member or cartridge 14 is secured in its operating position as shown in FIG. 1, the member 14 has its outer annular surface 45 exposed to the liquid in the degassing chamber 18, and its inner annular surface 46, together with the bottom surface of the cap 30 defining a portion of the second chamber 17 into which the deaerated or degassed liquid flows after passing through the degassing member 14. Although the preferred embodiment illustrates the member 14 as having an annular shape, it is contemplated that the size, shape and orientation of the member 14 may be varied to suit the needs of the user. For example, if the user is not concerned with the pressure drop across the member 14, a rectangularly shaped member may function sufficiently well. The inventor has illustrated an annular shaped member in the preferred embodiment because of the relatively large surface area which is exposed to the degassing chamber 18 and because this shape has worked well when used for the preparation of deaerated dialysate for use with artificial kidney equipment.

The material from which the degassing member 14 is constructed is a dense, finely entwined, porous material having physical properties which permit liquid to pass through the material but which causes dissolved and entrained gases in the liquid to coalesce near the surface of the material. As more and more gases coalesce on the surface of the member 14, the collected gas bubble becomes sufficiently large so that the air bubble ascends to the top of the degassing chamber 18 due to the buoyancy of the bubble. This air bubble is then released or discharged through the valve 35. Although the member 14 may be constructed from a variety of different types of materials, the inventor has found that a finely entwined porous matrix constructed from materials such as porous ceramic, epoxy and fiberglass resins, and filter spun materials work sufficiently well. More specifically, the inventor has found a Cuno Micro-wynd filter having a desity of one micron and manufactured by American Machine and Foundry Company and filter cartridges, Models AA, A, B and C, manufactured by W. and R. Balston Industrial Ltd. to be sufficient for deaerating dialysate for use in artificial kidney machines.

One of the physical properties which determines whether a certain material will be sufficient for use as a degassing member 14 is the density. As mentioned above the inventor has found filter Models AA, A, B and C manufactured by W. and R. Balston Industrial Ltd. to have sufficient density for use in connection with the preparation of kidney dialysate. The density of these filters range from about 0.3 microns to about 8.0 microns. Normally, in the field of the present invention, density refers to the size of particle which will not be allowed to pass through the material. For example, a material having a density of 2 microns will allow particles less than 2 microns to pass through the material but will filter out particles which are 2 microns in diameter or larger. The required density of a particular member 14 will depend upon the use of the deaerated liquid and upon the percentage of dissolved gases desired to be removed. Generally, the lower the density of the member 14, the lower the efficiency of removing entrained and dissolved gases from the liquid.

By referring to FIG. 1, the operation of the present invention may be summarized as follows: First, water or another liquid which is desired to be degased is pumped through the inlet port 15 and conduit 16 into the degasing chamber 18 where it is exposed to the outer annular surface 45 of the degassing member 14. Immediately, the liquid will begin to pass through the finely entwined porous material, however, the gases dissolved in the liquid will coalesce at the surface 45 and will not pass through the member 14. Be cause of the restriction caused by the member 14, the liquid level in the chamber 18 will rise until the float ball 39 is forced against the seat 36, at which time the pressure forcing the liquid into the chamber 18 will tend to force the liquid through the member 14 into the chamber 17. During the passage of liquid through the member 14 into the chamber the dissolved gases will continue to coalesce on the surface 45 until a sufficiently large air bubble is formed, at which time the bubble of air will rise from the surface 45 of the member 14 to the top of the casing 12. When the collected gases at the top of the casing 12 has amounted to a sufficient volume, the float ball 39 will drop and the collected gases will escape to the atmosphere. Simultaneously, the liquid level in the casing 12 will again rise so that the collecting and releasing cycle will continue. The liquid which passes through the degassing member 14 into the second chamber 17 is deaerated and may be discharged and put to any desired use.

Although the description of the preferred embodiment of the present invention has been very specific, it is contemplated that modifications may be made which would not depart from the spirit of the present invention. For example, the device of the present invention would operate equally well if the entire system were inverted and the float valve 39 or a similar relieving valve was positioned within the base 11. Thus, it is intended that the scope of the present invention be dictated by the appended claims rather than by the description of the preferred embodiment.

I claim:

1. An improved degassing apparatus for use with artificial kidney machines for obtaining gas-free dialysis liquid for use in said artificial kidney machines, said degassing apparatus comprising:

housing means defining a hollow interior;

a generally cylindrical degassing member mounted in said housing and cooperating therewith to divide said interior into the outer and inner chambers, said degassing member having outer and inner surfaces each defining a wall of said outer and inner chambers respectively;

means for supplying a liquid containing entrained and dissolved air to said outer chamber for exposure to the outer surface of said degassing member, and for passage through said degassing member only into said inner chamber;

said degassing member being constructed of finely entwined porous epoxy resin having physical properties and density sufficient to cause the entrained and dissolved air in the liquid to coalesce near the outer surface of the degassing member as the result of the passage of said liquid only through said degassing member;

and vent means including a float valve in said housing means for discharge of air from said outer chamber, said float valve being disposed to prevent escape of liquid through said vent means;

said housing defining a passageway for discharge of degassed liquid from said inner chamber.

2. The improved degassing apparatus of claim 1 wherein the density of said degassing member is greater than 8.0 microns, but not more than 0.3 microns.

* * * * *